United States Patent
Schulte

(10) Patent No.: US 6,478,382 B1
(45) Date of Patent: Nov. 12, 2002

(54) FASTENING SYSTEM FOR A MOTOR VEHICLE SEAT

(75) Inventor: Axel Schulte, Holzgerlingen (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 0 days.

(21) Appl. No.: 09/423,805

(22) PCT Filed: May 6, 1998

(86) PCT No.: PCT/EP98/02662
§ 371 (c)(1),
(2), (4) Date: Nov. 12, 1999

(87) PCT Pub. No.: WO99/44857
PCT Pub. Date: Sep. 10, 1999

(30) Foreign Application Priority Data

Mar. 3, 1998 (DE) .......................... 198 08 995

(51) Int. Cl.[7] .............................................. A47C 31/02
(52) U.S. Cl. .............................. 297/452.6; 297/452.59; 297/218.1; 297/218.3; 297/218.4
(58) Field of Search ........................ 297/452.6, 452.59, 297/218.1, 218.3, 218.4; 5/403, 406, 407

(56) References Cited

U.S. PATENT DOCUMENTS

| | | | | |
|---|---|---|---|---|
| 527,555 A | * | 10/1894 | Holmes | |
| 3,844,614 A | * | 10/1974 | Babbs | 297/452.59 |
| 4,222,428 A | * | 9/1980 | Scherer | 160/231 |
| 4,296,964 A | * | 10/1981 | Haack | 297/218 |
| 4,364,607 A | | 12/1982 | Tamburini | |
| 4,408,802 A | * | 10/1983 | Adomeit et al. | 297/452 |
| 5,309,612 A | * | 5/1994 | Briere et al. | 24/90 B |
| 5,499,859 A | * | 3/1996 | Angell | 297/218.3 |
| 5,509,718 A | * | 4/1996 | Neary | 297/228.12 |
| 5,762,842 A | * | 6/1998 | Burchi et al. | 264/46.4 |
| 5,829,828 A | * | 11/1998 | Asfaw | 297/219 |
| 6,048,025 A | * | 4/2000 | Tillner | 297/218.7 |

FOREIGN PATENT DOCUMENTS

| | | |
|---|---|---|
| DE | 4214510 A1 | 11/1993 |
| JP | 08280956 | 10/1996 |
| WO | 87/05480 | 9/1987 |
| WO | 96/01063 | 1/1996 |

* cited by examiner

Primary Examiner—Peter M. Cuomo
Assistant Examiner—Joseph Edell
(74) Attorney, Agent, or Firm—Roylance, Abrams, Berdo & Goodman, L.L.P.

(57) ABSTRACT

A fastening system is for a vehicle seat having at least one padded part of a foamed material surrounded by at least one upholstery part. The upholstery part is connected with at least one profiled strip having hooking elements on its periphery. A longitudinal channel is present in the padded part, corresponds in shape to the profiled strip, and has recesses along its longitudinal alignment. The recesses engage the hooking elements. This fastening system can be manufactured at low cost, is comfortable for the passenger and produces no disturbing noises.

8 Claims, 2 Drawing Sheets

FASTENING SYSTEM FOR A MOTOR VEHICLE SEAT

FIELD OF THE INVENTION

The present invention relates to a fastening system for a vehicle seat with at least one padded part of foamed material. The padded part is surrounded by at least one upholstered part. The upholstered part is connected with at least one profiled strip serving as hooking means having hooking elements along its exterior periphery. A longitudinal channel in the padded part corresponds to the shape of the profiled strip.

BACKGROUND OF THE INVENTION

A fastening system disclosed in DE 42 14 510 C2 includes tubular fastening strips with lateral recesses stitched on at some spacing from one another along the bottom of the upholstered part. The fastening strips attach the upholstered part to the padded part made of foamed material. These strips with recesses are also called stitched banners. Into each tubular-shaped fastening strip is inserted a profiled strip serving as hooking means with a cambered cross section, which embodies the hooking elements. The padded part has recesses extending correspondingly parallel and at some distance form the fastening strips and parallel to one another. Some plurality of double clamps are arranged in each recess. The double clamps are connected through screw connections with the padded part or are held therein by the foam. For anchoring of the padded upholstery part, the fastening strips with their profiled strips are introduced into the recesses of the padded part. The double clamp arrangements engage through the side apertures of the fastening strip and engage in a hooking engagement at the rear by hooking into the profiled strip with their camber-like cross section.

Such fastening system has a complicated structure and is costly to manufacture, because of the plurality of double clamps necessitated in the padded carrier. With intermittent thrust-like strains applied to the top of the vehicle seat pad, the passenger in the seat is not prevented from resting on the solidly constructed double clamp, to disturb the comfort of the seated passenger. Furthermore, undesirable noise disruptions are a problem with this fastening system.

A fastening system for a vehicle eat disclosed in U.S. Pat. No. 4,364,607 includes a longitudinal channel, outside the upholstery part and adapted to the shape of the profiled strip. The channel serves in its longitudinal alignment as recess for the engagement of the hooking elements. The longitudinal channel extends along the seat frame of the vehicle seat, so that the upholstery part can be mounted securely only along the frame and cannot, for example, be stretched along fictive seams within the padded part of foamed material. The upholstery part is received between the profiled strip following the path of the longitudinal channel and the longitudinal channel itself. Clamp-like projections on the profiled strip press the upholstery part against the interior wall of the longitudinal channel. Tearing of the upholstery part out of these mounting points is not precluded, especially during impact stress on the padded part.

SUMMARY OF THE INVENTION

Objects of the present invention are to provide an improved fastening system for attaching an upholstered part to a padded part which is simple and inexpensive to manufacture and assemble, will not disturb passenger comfort and will resist tearing of the upholstered part.

The foregoing objects are basically obtained by a fastening system for a vehicle seat with a padded part surrounded by an upholstered part. The fastening system comprises a longitudinal channel in the padded part. The channel has recesses in its longitudinal alignment to engage hooking elements. The recesses open into the longitudinal channel and are of chute-like configuration. A profiled strip cooperates directly with the foamed material of the padded part, so that the complicated massive structural double clamp arrangement can be deleted.

The arrangement requires a specifically selected fixing of the upholstery part on the padded part by the hooking elements of the profiled strip. The hooks stand in direct engagement with the recesses. Adhesive forces can occur between the finely porous foamed material and the profiled strip, reinforcing the secure connection. Because of the receiving and fitting of the profiled strip within the longitudinal channel of the padded part, no disturbance bothers the seated passenger, even in the case of impact-like forces, as can occur during the operation of a vehicle, which most extensively presses foamed material together. Considered in some detail, uncomfortable noise formations are also avoided.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

The fastening system is to be used for a vehicle seat, not shown in detail, for example in the form of a motor-powered vehicle or aircraft seat. Such seats basically comprise a seat part and backrest part, provided with padding, especially in the form of individual padded parts 10. Padded parts 10 comprise shaped plastic foamed material surrounded on the exterior by at least one upholstery part 11, for example made up of upholstery materials or the like. The fastening system of the present invention connects the upholstery with padded part 10, and holds the upholstery part securely along predeterminable stitched seam patterns 11a.

Figure 1:
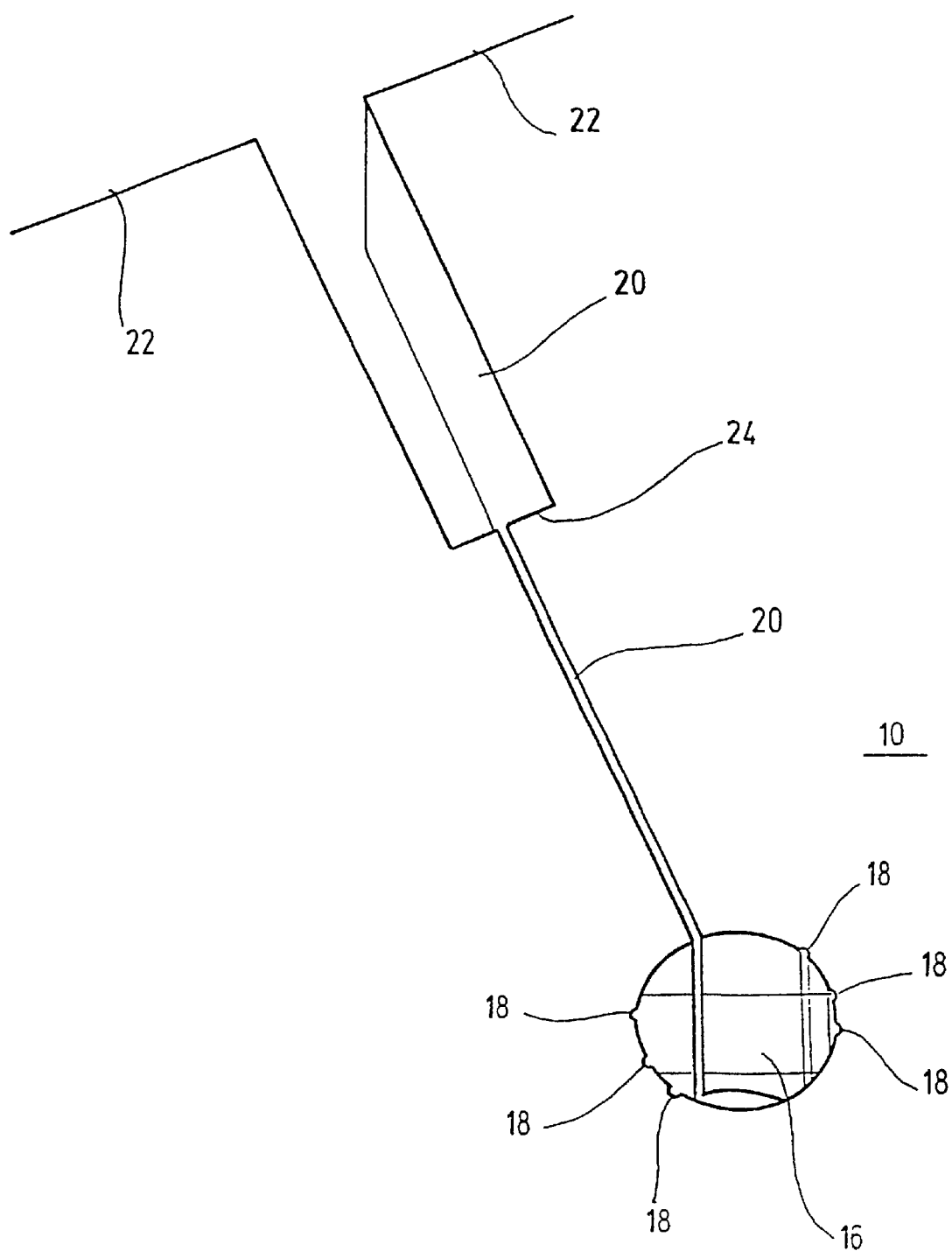
FIG. 1 is a perspective view of a partial cross section of the foamed padded part with a slit-like opening and a longitudinal channel.

For this purpose, the fastening system has at least one profiled strip 12 serving as hooking means. The strip is flexible and able to be arranged along desired predeterminable separating seams on the upholstery part where they can be connected with this part. As is shown particularly in FIG. 2, profiled strip 12 has hooking elements 14 on the exterior. In padded part 10, as shown in FIG. 1, a longitudinal channel 16 is adapted to fit the shape of the relevant profiled strip 12, and has recesses 18 extending along its longitudinal alignment. The recesses are provided for engagement with the hooking elements 14. Longitudinal channel 16 is configured to be essentially spherical or circular in cross section. A slit opening 20 in longitudinal channel 16 opens to the outside of the foam padded part 10. As FIG. 1 shows, slit opening 20 widens as it proceeds from longitudinal channel 16 to the outside 22. The widening is in a stepped manner with set-off shoulders 24 in open cross section. Recesses 18 of longitudinal channel 16 are arranged diametrically opposite one another in longitudinal alignment, and open groove-like in longitudinal channel 16. Individual recesses 18, therefore, define chute-like hollow profile web segments.

Figure 2:
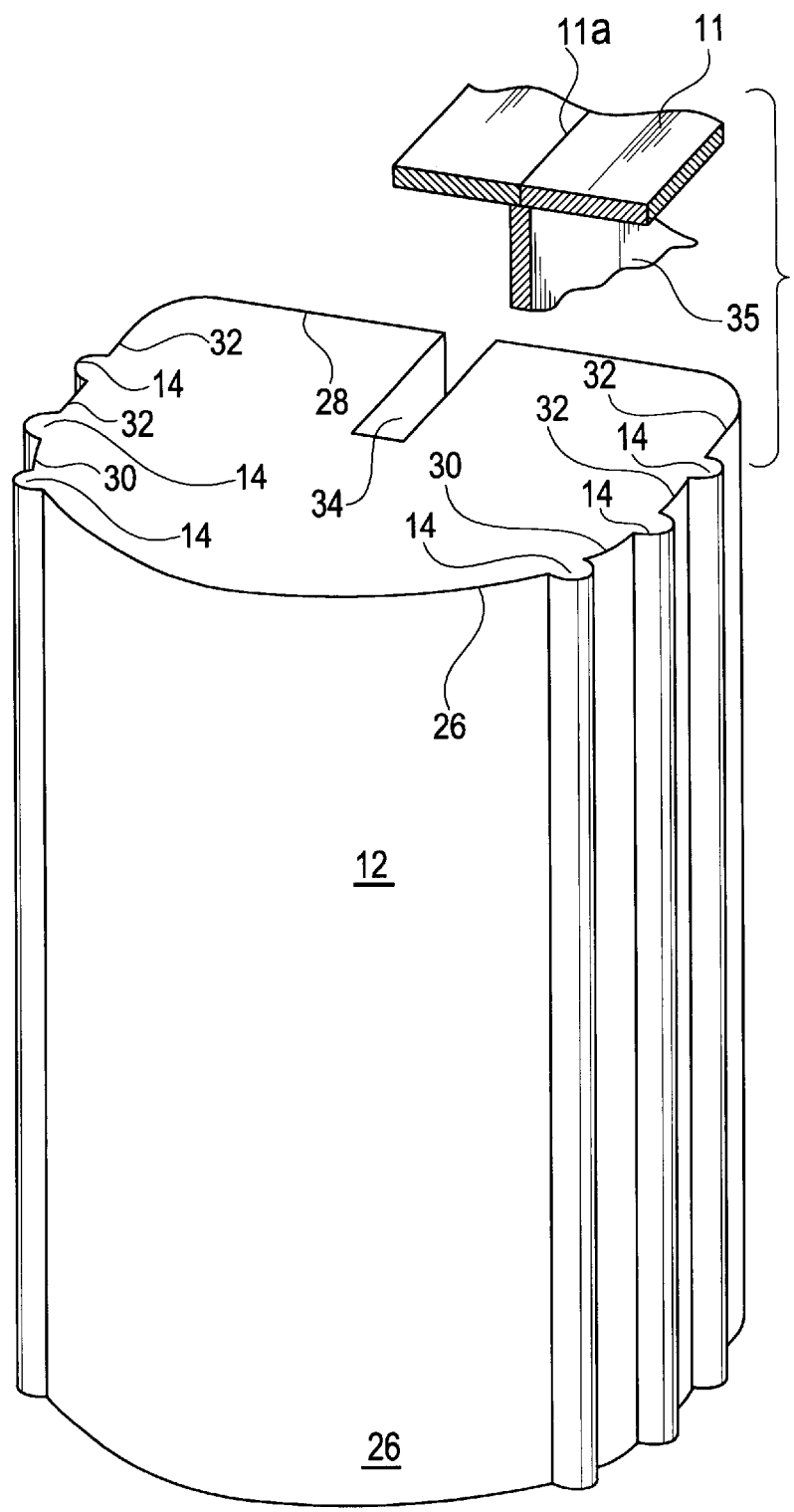
FIG. 2 is a perspective view of a partial section of a profiled strip for insertion in the longitudinal channel shown in FIG. 1.

As also shown in FIG. 2, hooking elements 14 are an integral part of profiled strip 12 and can engage as profile-like extensions into chute-like recesses 18 along their entire longitudinal alignment. Profiled strip 12, to be inserted in the associated longitudinal channel 16, is provided with a convex-shaped contact surface 26 on its side at a greater distance or remote from slit opening 20. On its side 28 directly adjacent to the slit opening, strip 12 is configured to be flat. Contact surface 26 is bordered on its edges along the longitudinal alignment of profiled strip 12 by the subsequent or following hooking elements 14. The intermediate segment piece 30 between two hooking elements 14, which laterally succeed the contact surface 26, is likewise configured to be convex and consequently is provided with a rounded shape. The subsequently succeeding segments 32 of each side wall of profiled strip 12 are configured to be flat.

The flat side 28 of profiled strip 12 is provided in the middle with a slit-like receiving channel 34. Channel 34 opens and extends toward slit opening 20, when profiled strip 12 is inserted in longitudinal channel 16. This slit-like receiving channel 34 of profiled strip 12 serves for receiving a connection strip 35, not described in greater detail, which is indicated in technical terms also as stitched banners. The connection between profiled strip 12 and the upholstery part can be produced by the connection strip. The connection strip extends under tension through the slit opening 20 in padded part 10, and tends to draw the upholstery material in the direction of longitudinal channel 16. Preferably the connection strip or the stitched banner is laid out in receiving channel 34 of profiled strip 12. When profiled strip 12 is still in a soft state, the strip is compressed in a manner such that receiving channel 34 is narrowed and a tight connection with the connection strip or the stitched banner is produced. Dependent upon the processing method to be used, the connection strip is selected so that it is stitchable, ultrasound-weldable or high frequency-weldable.

The side of profiled strip 12 at a greater distance or remote from slit opening 20, in other words at convex contact surface 28, is configured as capable of gliding or sliding and/or is provided with a suitable sliding agent. On the basis of this increased gliding or sliding capacity in the bottom area, the relevant profiled strip 12 can be displaced more simply during assembly of the seat through slit opening 20 into receiving channel 34 for further anchoring. The other side portions 28, 30 and 32 are configured inherently with or are provided with an anti-slip means to prevent slippage, in order to attain improved anchoring of profiled strip 12 in the associated receiving channel 16. Since recesses 18 can be of less than 1 mm in depth, the anchoring of the associated anchoring elements 14 finds reinforcement for adherence in recesses 18, which by their shape assist with the form- and force-fitting anchoring of padded part 10 in the foamed material. It is further beneficial to provide the anchoring such that the cross sectional dimensions of profiled strip 12 are selected to be slightly greater than the corresponding cross sectional profile for longitudinal channel 16. In this manner, the finely porous foamed material when correspondingly pressed together exerts a counter holding force on profiled strip 12.

The solidly configured profiled strip 12, which in technical terms is called a "profile clamp," is preferably a monoextrudate and is of soft plastic material, for example of elasten material. Olefins and PVC are especially preferred in this case. Moreover, the materials used are disposable and recyclable. The cited connection of profiled strip 12 with padded part 10 by means of longitudinal channel 16 can be reversible and is easy to construct during assembly. Costly auxiliary means are deleted. The danger of destruction because of breakdown of sharp-edged parts is for the most part overcome by the use of plastic materials exclusively, with the parts in form-fitted and force-fitted connection with one another. Therefore, a high measure of seat comfort is attained. The generation of noise, such as metallic squeaks or the like, is totally overcome. The flexible profiled strip can be manufactured in any desired configuration, even three-dimensional, so that any desirable structural shape is possible for a vehicle seat.

For the production of longitudinal channel 16 in foamed material 10, a so-called blowhole or channel is arranged in the manufacturing mold. Following the foaming up, the channel forms the exterior contour of slit opening 20, as it is found arranged at the free end of a wire-like mold body, having mold elements corresponding to the hooking elements 14 of profiled strip 12. The open areas according to the representation in FIG. 1 in the foam mold, in other words the open areas in padded part 10, originate with the subsequent foaming up of the mold, not shown in greater detail. Instead of recesses 18 being channel-like, they can be produced by means of a helix or the like and also be spiral-shaped or can originate only at some spacing from one another in the form of receiving points dependent on the blowhole or channel shape being used and the relevant mold shape used for longitudinal channel 16.

While an embodiment has been chosen to illustrate the invention, it will be understood by those skilled in the art that various changes and modifications can be made therein without departing from the scope of the invention as defined in the appended claims.

What is claimed is:

1. A fastening system for a vehicle seat having at least one padded part of foamed material surrounded by at least one upholstery part, comprising:

at least one profiled strip connected to the upholstery part, said profiled strip having hooking elements thereon;

at least one longitudinal channel shaped to correspond to said profiled strip and located in the padded part, said longitudinal channel having recesses extending in longitudinal alignment with said longitudinal channel and being engageable with said hooking elements, said recesses opening into said longitudinal channel and having a configuration of a chute, said longitudinal channel being spherical in cross section;

a slit opening extending from and opening on said longitudinal channel, opening on an exterior surface of the padded part and widening in cross section in a direction of the exterior of the padded part adjacent at least one set-off shoulder;

a convex contact surface on a first side of said profiled strip remote from said slit opening; and a flat surface on a second side of said profiled strip adjacent to said slit opening, said flat surface including a slit receiving channel opening into an extension of said slit opening.

2. A fastening system according to claim 1 wherein said recesses are arranged in pairs diametrically opposite one another.

3. A fastening system according to claim 2 wherein said hooking elements are integral parts of said profiled strip and are engaged in said recesses along entire longitudinal alignments thereof.

4. A fastening strip according to claim 1 wherein said convex contact surface is configured to slide relative to the padded part; and
other surfaces of said profiled strip, including said hooking elements, are configured to prevent slippage relative to said padded part.

5. A fastening system according to claim 1 wherein said receiving channel can receive a connection strip for connecting said profiled strip and the upholstery part, and extending through said slit opening.

6. A fastening system according to claim 1 wherein said profiled strip is a mono-extrudate of a soft plastic material.

7. A fastening system according to claim 6 wherein said soft plastic material is elasten.

8. A fastening system according to claim 7 wherein said elasten is an olefin or PVC.

* * * * *